US011362353B2

(12) United States Patent
Fukatsu

(10) Patent No.: US 11,362,353 B2
(45) Date of Patent: Jun. 14, 2022

(54) FUEL CELL, CONTROL METHOD FOR FUEL CELL, AND COMPUTER READABLE RECORDING MEDIUM

(71) Applicant: BROTHER KOGYO KABUSHIKI KAISHA, Nagoya (JP)

(72) Inventor: Yoshiaki Fukatsu, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/149,288

(22) Filed: Jan. 14, 2021

(65) Prior Publication Data

US 2021/0135260 A1    May 6, 2021

Related U.S. Application Data

(60) Division of application No. 16/036,365, filed on Jul. 16, 2018, now Pat. No. 10,930,955, which is a continuation of application No. PCT/JP2016/085349, filed on Nov. 29, 2016.

(30) Foreign Application Priority Data

Jan. 21, 2016    (JP) .............................. JP2016-010035

(51) Int. Cl.
  *H01M 8/04*      (2016.01)
  *H01M 8/04701*   (2016.01)
  (Continued)

(52) U.S. Cl.
  CPC ..... *H01M 8/04731* (2013.01); *H01M 8/0432* (2013.01); *H01M 8/04089* (2013.01);
  (Continued)

(58) Field of Classification Search
  CPC ......... H01M 8/04731; H01M 8/04089; H01M 8/04164; H01M 8/04253
  See application file for complete search history.

(56) References Cited

U.S. PATENT DOCUMENTS 5,653,106 A * 8/1997 Katashiba ........... F28D 20/0034
                                                    60/300
9,306,229 B2    4/2016 Miyata et al.
(Continued)

FOREIGN PATENT DOCUMENTS

JP    H06-011203 A    1/1994
JP    H06-074361 A    3/1994
(Continued)

OTHER PUBLICATIONS

International Preliminary Report on Patentability issued in connection with International Patent Application No. PCT/JP2016/085349, dated Jul. 24, 2018. (6 pages).
(Continued)

*Primary Examiner* — Olatunji A Godo
(74) *Attorney, Agent, or Firm* — K&L Gates LLP

(57) ABSTRACT

A fuel cell, a control method of the fuel cell, and a non-transitory computer readable recording medium recording a computer program capable of favorably generating power while suppressing leakage of gas and preventing the solenoid valve from being frozen with a simple configuration. The fuel cell includes a stack configure to generate electricity by reacting hydrogen and oxygen, an exhaust valve or a drain valve which is a solenoid valve discharging gas discharged from the stack to the outside, and a control unit configured to control energization of the exhaust valve. The exhaust valves are aligned in a gas discharging direction whereas the drain valves are aligned in a water discharging direction. If there is a risk of any solenoid valve being frozen, the control unit performs energization processing of energizing other solenoid valves in the state where at least one of the aligned solenoid valves is closed.

8 Claims, 8 Drawing Sheets

(51) Int. Cl.
    *H01M 8/04223*    (2016.01)
    *H01M 8/04119*    (2016.01)
    *H01M 8/0432*     (2016.01)
    *H01M 8/04089*    (2016.01)
    *H01M 8/10*       (2016.01)
    *H01M 8/04746*    (2016.01)
    *H01M 8/04828*    (2016.01)

(52) U.S. Cl.
    CPC ... *H01M 8/04164* (2013.01); *H01M 8/04253* (2013.01); *H01M 8/04365* (2013.01); *H01M 8/04373* (2013.01); *H01M 8/04761* (2013.01); *H01M 8/04843* (2013.01); *H01M 8/10* (2013.01)

(56)　　　　References Cited

U.S. PATENT DOCUMENTS

| | | |
|---|---|---|
| 2007/0128488 A1 | 6/2007 | Aoki et al. |
| 2007/0154746 A1 | 7/2007 | Penev et al. |
| 2008/0220303 A1* | 9/2008 | Yoshida ............ H01M 8/04395 429/423 |
| 2009/0258277 A1 | 10/2009 | Fujita |
| 2014/0329156 A1 | 11/2014 | Mathie et al. |
| 2015/0053491 A1 | 2/2015 | Tang et al. |
| 2018/0294496 A1 | 10/2018 | Takeda et al. |

FOREIGN PATENT DOCUMENTS

| | | |
|---|---|---|
| JP | 2004-185969 A | 7/2004 |
| JP | 2006-134647 A | 5/2006 |
| JP | 2011-003465 A | 1/2011 |
| WO | 2006/048983 A1 | 5/2006 |

OTHER PUBLICATIONS

International Search Report and Written Opinion issued in connection with International Patent Application No. PCT/JP2016/085349, dated Feb. 21, 2017. (9 pages).

* cited by examiner

FUEL CELL, CONTROL METHOD FOR FUEL CELL, AND COMPUTER READABLE RECORDING MEDIUM

CROSS-REFERENCE TO RELATED APPLICATIONS

The present application is a divisional application of U.S. patent application Ser. No. 16/036,365, filed on Jul. 16, 2018, which is a continuation of International Application No. PCT/JP2016/085349, filed on Nov. 29, 2016, which claims priority to Japanese Patent Application No. 2016-010035, filed on Jan. 21, 2016. The contents of these applications are incorporated herein by reference in their entirety.

FIELD

The present disclosure relates to: a fuel cell provided with a power generation unit configured to generate electricity by reacting hydrogen and oxygen, a solenoid valve for discharging gas or water emitted from the power generation unit to the outside, and a control unit configured to control energization of the solenoid valve; a control method for a fuel cell; and a non-transitory computer readable recording medium recording a computer program for causing a computer to execute processing of controlling gas discharge.

BACKGROUND

Examples of a battery cell which obtains electromotive force by sending hydrogen to a negative electrode include a fuel cell, a nickel-hydrogen cell and the like.

Since a fuel cell is a clean power generator having high power generation efficiency that may serve to construct a cogeneration system without being affected by the magnitude of the load, it has been considered to employ a fuel cell in various purposes including digital household electric appliances such as a personal computer and a portable telephone, an electric vehicle, a railroad, a base station of a portable telephone, a power plant and so forth.

A fuel cell includes a stack, multiple hydrogen pumps, a hydrogen circulation passage and a hydrogen supply passage.

The stack is obtained by sandwiching a solid polymer electrolyte membrane between a negative electrode and a positive electrode from both sides so as to form a membrane electrode assembly, locating a pair of separators on both sides of the membrane electrode assembly so as to compose a plate-like unit cell, and laminating and packaging a plurality of such unit cells.

One end of the hydrogen supply passage is connected with the hydrogen pump via a regulator and an on-off valve, and the other end thereof is connected with a part, which is close to the negative electrode of the stack, of the hydrogen circulation passage. Hydrogen flows from the hydrogen pump through the hydrogen supply passage, passes through the part of the hydrogen circulation passage that is close to the negative electrode to be sent out to a portion on the negative electrode side within the stack, and flows through a flow passage in the portion. Hydrogen, which has flown through the flow passage and is discharged from the stack, flows through the hydrogen circulation passage and is returned to the stack.

When hydrogen is supplied to the stack so that fuel gas containing hydrogen comes into contact with the negative electrode and oxidation gas containing oxygen such as air comes into contact with the positive electrode, an electrochemical reaction occurs on both of the electrodes and electromotive force is generated.

For the fuel cell, a hydrogen circulation system is employed where off gas (discharge gas containing unreacted hydrogen) discharged from the negative electrode as described above is circulated to the portion on the negative electrode side of the stack, which has enhanced the use efficiency of hydrogen. The unreacted hydrogen in the off gas is utilized for power generation of the fuel cell while impurities in the off gas remain in the hydrogen circulation passage, causing a problem of increasing the concentration of impurities at the portion on the negative electrode side as power generation is performed and thereby lowering the power generation efficiency in the fuel cell. Accordingly, the off gas in the hydrogen circulation passage is purged to the outside at appropriate timings.

Since the off gas also contains moisture that has transmitted through the electrolyte membrane from the positive electrode side, a gas-liquid separator is located in the hydrogen circulation passage to separate gas from water, returning gas to the power generation unit while discharging retained water at appropriate timings.

A solenoid valve is used as a discharge valve for gas or water. Since a gas discharge valve, not only a water discharge valve, also has moisture contained in gas as described above, a poppet part of such discharge valve may be frozen depending on the outside temperature. This may prevent the discharge valve from operating, making it impossible to generate electricity. If the discharge valve is opened here, the poppet part may be damaged and a hydrogen leak may occur in the case where the discharge valve is for the hydrogen circulation passage.

Japanese Patent Application Laid-Open Publication No. H6-74361 discloses the invention of an anti-freeze circuit of a solenoid valve in which current having a polarity opposite to that of the drive current is applied, in the state where no drive current flows through the drive wiring of the solenoid valve, to a drive wiring via a contact which is made conductive when a relay circuit applying driving current to the solenoid valve is not biased, to heat the drive wiring and prevent freezing.

SUMMARY

A typical solenoid valve, however, is opened even if current having a polarity opposite to that of the drive current is applied as in Japanese Patent Application Laid-Open Publication No. H6-74361. This has caused a problem in that only a special solenoid valve may be used that would not be opened by current with the opposite polarity.

The present disclosure has been made in view of the circumstances described above, and aims to provide: a fuel cell capable of favorably generating electricity while suppressing leakage of gas and preventing freezing of a solenoid valve with a simple configuration; a control method for a fuel cell; and a recording medium recording a computer program so as to allow a computer to read the program.

In a fuel cell according to the present disclosure comprising: a power generation unit configured to generate electricity by reacting hydrogen and oxygen; a solenoid valve for discharging gas or water emitted from the power generation unit to the outside; and a control unit configured to control energization of the solenoid valve, a plurality of the solenoid valves are aligned along a discharging direction in which the gas or the water is discharged, a temperature detection unit configured to detect the temperature of a solenoid valve on the downstream side in the discharging direction is provided, and if the temperature of the solenoid valve is equal to or lower than a predetermined value, the control unit energizes a solenoid valve on a more upstream side than the solenoid valve on the downstream side, and closes at least one of the other solenoid valves aligned with the energized solenoid valve.

Here, "a plurality of the solenoid valves are aligned along a discharging direction in which the gas or the water is discharged" means that "multiple solenoid valves are aligned in a direction of discharging gas" and/or "multiple solenoid valves are aligned in a direction of discharging water," and "in the case where gas and water are simultaneously discharged, multiple solenoid valves are aligned in the discharging direction for the gas and the water."

In a fuel cell according to the present disclosure comprising: a power generation unit configured to generate electricity by reacting hydrogen and oxygen; a solenoid valve for discharging gas or water emitted from the power generation unit to the outside; and a control unit configured to control energization of the solenoid valve, a plurality of the solenoid valves are aligned along a direction in which the gas or the water is discharged, a plurality of temperature detection units configured to detect temperatures of respective solenoid valves are provided, and if the temperature of a solenoid valve on the downstream side in the discharging direction is equal to or lower than the first predetermined value, the control unit energizes the solenoid valve while closing at least one of the other solenoid valves aligned with the energized solenoid valve.

A control method according to the present disclosure for controlling a fuel cell comprising a power generation unit configured to generate electricity by reacting hydrogen and oxygen, a plurality of aligned solenoid valves for discharging gas or water emitted from the power generation unit to the outside, a control unit configured to control energization of the solenoid valves, and a temperature detection unit configured to detect the temperature of a solenoid valve on the downstream side in a discharging direction, comprises: detecting the temperature of the solenoid valve, and if the temperature of the solenoid valve is equal to or lower than a predetermined value, energizing a solenoid valve at a more upper stream side in the discharge direction than the solenoid valve on the downstream side, and closing at least one of the other solenoid valves aligned with the energized solenoid valve.

A control method according to the present disclosure for controlling a fuel cell comprising a power generation unit configured to generate electricity by reacting hydrogen and oxygen, a plurality of aligned solenoid valves for discharging gas or water discharged from the power generation unit to the outside, a control unit configured to control energization of the solenoid valve, and a plurality of temperature detection units configured to detect the temperatures of respective solenoid valves, comprises: detecting the temperatures of the solenoid valves respectively; and if the temperature of the solenoid valve on a downstream side in the discharging direction is equal to or lower than a first predetermined value, energizing the solenoid valve while closing at least one of the other solenoid valves aligned with the energized solenoid valve.

A non-transitory computer readable recording medium according to the present disclosure records a computer program causing a computer configured to control a fuel cell comprising a power generation unit configured to generate electricity by reacting hydrogen and oxygen, a plurality of aligned solenoid valves for discharging gas or water emitted from the power generation unit to the outside, a control unit configured to control energization of the solenoid valves, and a temperature detection unit configured to detect the temperature of a solenoid valve on a downstream side in the discharging direction, to execute processing of obtaining a temperature of the solenoid valve, determining whether or not the temperature of the solenoid valve is equal to or lower than a predetermined value, and outputting, if it is determined that the temperature of the solenoid valve is equal to or lower than the predetermined value, a command to energize a solenoid valve on a more upstream side in the discharging direction than the solenoid valve on the downstream side, and to close at least one of the other solenoid valves aligned with the energized solenoid valve.

A non-transitory computer readable recording medium according to the present disclosure records a computer program causing a computer configured to control a fuel cell comprising: a power generation unit configured to generate electricity by reacting hydrogen and oxygen; a plurality of aligned solenoid valves for discharging gas or water emitted from the power generation unit to the outside; a control unit configured to control energization of the solenoid valves; and a plurality of temperature detection units configured to detect temperatures of solenoid valves respectively, to execute processing of obtaining temperatures of the solenoid valves respectively, determining whether or not the temperature of a solenoid valve on the downstream side in the discharging direction is equal to or lower than a first predetermined value, and outputting, if it is determined that the temperature of the solenoid valve is equal to or lower than the first predetermined value, a command to energize the solenoid valve and to close at least one of the other solenoid valves aligned with the energized solenoid valve.

According to the present disclosure, a simple configuration may suppress leakage of gas, prevent freezing of solenoid valves and thus achieve favorable power generation.

The above and further objects and features will more fully be apparent from the following detailed description with accompanying drawings.

DETAILED DESCRIPTION

The present disclosure will specifically be described below with reference to the drawings illustrating the embodiments thereof.

Embodiment 1

Figure 1:
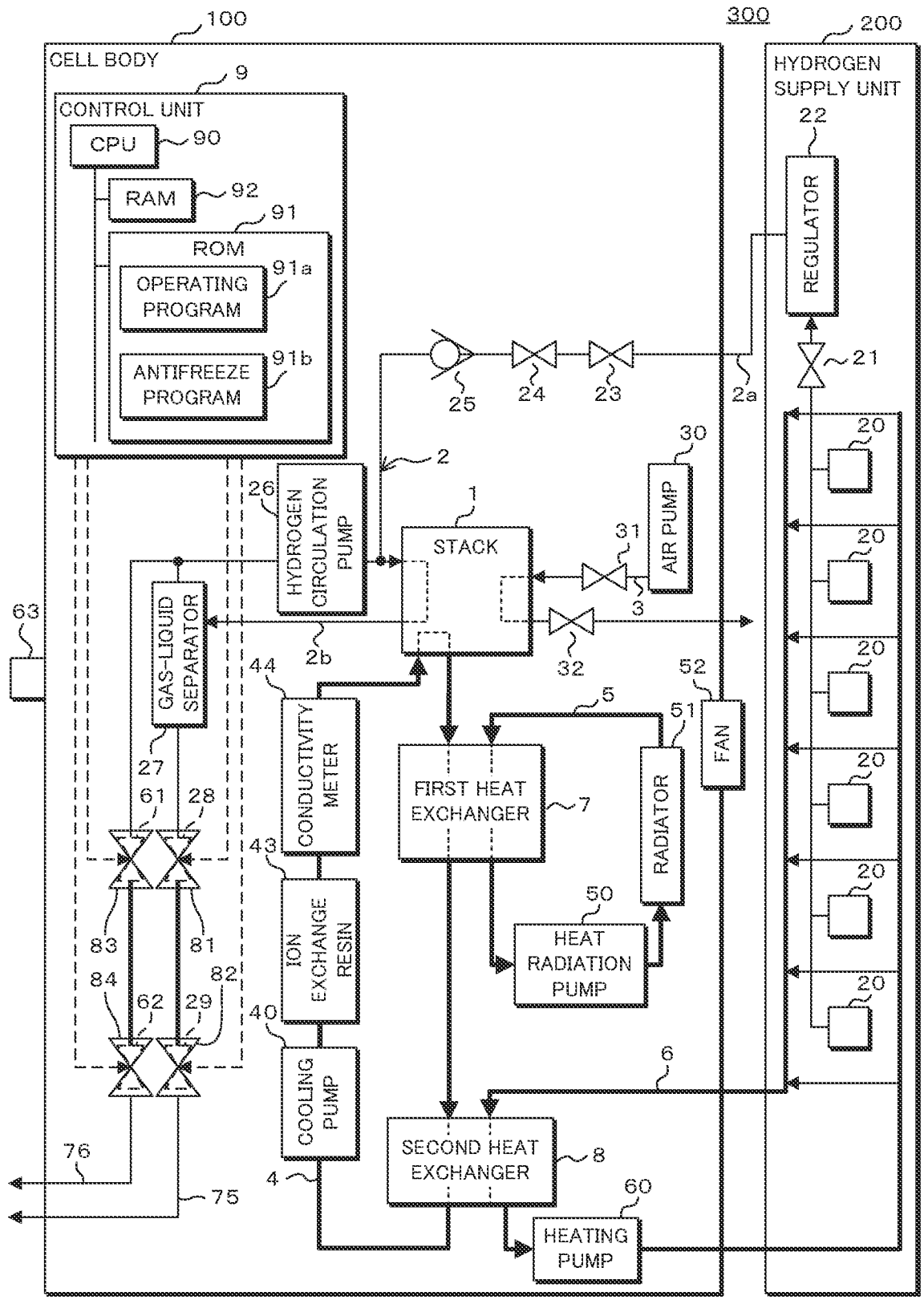
FIG. 1 is a block diagram illustrating a fuel cell according to Embodiment 1.

FIG. 1 is a block diagram illustrating a fuel cell 300 according to Embodiment 1.

The fuel cell 300 is provided with a cell body 100 and a hydrogen supply unit 200. The cell body 100 is a cell body such as a solid polymer electrolyte fuel cell, for example.

The cell body 100 is provided with a stack 1, a hydrogen flow passage 2 (hydrogen supply passage 2a and hydrogen circulation passage 2b), an air flow passage 3, a stack cooling passage 4, a radiator flow passage 5, a cylinder heating passage 6, a first heat exchanger 7, a second heat exchanger 8, a control unit 9, a gas-liquid separator 27, drain valves 28 and 29, a hydrogen circulation pump 26, an air pump 30, a cooling pump 40, a heat radiation pump 50, a radiator 51, a fan 52, a heating pump 60, exhaust valves 61 and 62, a temperature sensor 63, a drainage 75 and an exhaust passage 76. The second heat exchanger 8 is provided with a heater (not illustrated).

The hydrogen supply unit 200 is provided with a plurality of metal hydride (MH) cylinders 20, an on-off valve 21 and a regulator 22. Each MH cylinder 20 is filled with a hydrogen storage alloy. The on-off valve 21 is connected with all of the MH cylinders 20 and is also connected with the regulator 22. The supply pressure of hydrogen is adjusted by the regulator 22. A reaction occurred when the hydrogen storage alloy in the MH cylinders 20 releases hydrogen is an endothermic reaction.

The stack 1 is obtained by sandwiching a solid polymer electrolyte membrane between a negative electrode and a positive electrode from both sides so as to form a membrane electrode assembly, locating a pair of separators on both sides of the membrane electrode assembly so as to compose a plate-like unit cell, and laminating and packaging a plurality of such unit cells.

When fuel gas containing hydrogen, which has flown in from the hydrogen supply unit 200, comes into contact with the negative electrode and oxidation gas containing oxygen such as air flows in from the air flow passage 3 and comes into contact with the positive electrode, an electrochemical reaction occurs on both electrodes and electromotive force is generated. In this electrochemical reaction, water is generated from a reaction between a hydrogen ion, which has been transmitted through the solid polymer electrolyte membrane from the negative electrode side, and oxygen in the oxidation gas.

One end of the hydrogen supply passage 2a is connected with the regulator 22, while the other end thereof is connected with a part, which is close to the negative electrode of the stack 1, of the hydrogen circulation passage 2b. The hydrogen supply passage 2a is provided with an on-off valve 23, an on-off valve 24 and a check valve 25, which are positioned in this order from the hydrogen supply unit 200 side.

The hydrogen circulation pump 26 is provided at the hydrogen circulation passage 2b. The fuel cell 300 is constructed in such a manner that, when the on-off valve 23 and the on-off valve 24 are opened, hydrogen flows from the regulator 22 through the hydrogen supply passage 2a via the on-off valve 23, the on-off valve 24 and the check valve 25, is pumped by the hydrogen circulation pump 26 to flow through the hydrogen circulation passage 2b, and is sent out to a part on the negative electrode side of the stack 1 to flow through a flow passage in this part. Hydrogen, impurities (including impurities originally contained in hydrogen as well as impurities generated by reaction) and moisture, which have flown through the flow passage and are discharged from the stack 1, flow through the hydrogen circulation passage 2b and are sent to the gas-liquid separator 27.

In the gas-liquid separator 27, the hydrogen and the like are separated into water and gas containing hydrogen and impurities.

The drainage 75 is connected with the lower side of the gas-liquid separator 27, and is provided with the drain valves 28 and 29, which are electromagnetic valves, arranged in series.

The exhaust passage 76 is branched at the upper side of the gas-liquid separator 27 to extend from the hydrogen circulation passage 2b, and is provided with exhaust valves 61 and 62 arranged in series for discharging the gas. The gas flows through the exhaust passage 76 by energizing and opening the exhaust valves 61 and 62 at an appropriate timing, and is discharged to the outside.

At the gas-liquid separator 27, when the discharge valves 61 and 62 are closed, the separated gas flows from the gas-liquid separator 27 through the hydrogen circulation passage 2b to be sent to the hydrogen circulation pump 26 and to be returned to the stack 1. The water obtained by separation at the gas-liquid separator 27 is stored and, if it reaches a predetermined amount, the discharge valves 28 and 29 are energized and opened so that the water flows through the drainage 75 and is discharged to the outside.

The discharge valves 28 and 29 are covered with heat insulating materials 81 and 82, respectively. A portion of the drainage 75 between the discharge valves 28 and 29 is also covered with a heat insulating material. The portion covered with the heat insulating material is indicated by a thick line in FIG. 1. Though not required, a heat insulating material may preferably be employed as it may retain the heat generated by energization of the discharge valve 28 or 29 in the case of performing the second energization processing, which will be described later, and thus may more favorably prevent freezing. It is also possible to cover the entire drainage 75 with a heat insulating material.

The discharge valves 61 and 62 are covered with heat insulating materials 83 and 84, respectively. A portion of the drainage 76 between the discharge valves 61 and 62 is also covered with a heat insulating material. The portion covered with the heat insulating material is indicated by a thick line in FIG. 1. Though not required, a heat insulating material may preferably be employed as it may retain the heat generated by energization of the discharge valve 61 or 62 in the case of performing the second energization processing, which will be described later, and thus may more favorably prevent freezing. It is also possible to cover the entire drainage 76 with a heat insulating material.

The air pump 30 is provided at the air flow passage 3. In addition, an on-off valve 31 is provided at an inlet side part of the air flow passage 3 to the stack 1, and an on-off valve 32 is provided at an outlet side part thereof from the stack 1. The fuel cell 300 is constructed in such a manner that, when the on-off valve 31 and the on-off valve 32 are opened, air sent out from the air pump 30 flows through the air flow passage 3 and the on-off valve 31, is guided into a positive electrode side part of the stack 1, and flows through a flow passage of this part. Air, which has flown through the flow passage, is discharged from the stack 1, and is discharged through the on-off valve 32 to the outside.

A cooling pump 40, an ion exchange resin 43 and a conductivity meter 44 are provided at the stack cooling passage 4. The fuel cell 300 is constructed in a such manner that cooling water, which is sent out from the cooling pump 40 and flows through the stack cooling passage 4, flows through the ion exchange resin 43, the conductivity of the cooling water is measured by the conductivity meter 44, and the cooling water is then guided into the stack 1, flows through a flow passage in the stack 1, is then discharged, flows through the first heat exchanger 7 and the second heat exchanger 8, and returns to the cooling pump 40. The ion exchange resin 43 adsorbs ions included in cooling water which flows through the stack cooling passage 4. When the ion content becomes high, the conductivity of cooling water becomes high and the power generation efficiency of the stack 1 is lowered. It is therefore necessary to cause the ion exchange resin 43 to adsorb metal ions or the like.

The heat radiation pump 50 is provided at the radiator flow passage 5. The fuel cell 300 is constructed in a such manner that heat radiation liquid such as antifreeze liquid sent out from the heat radiation pump 50 flows through the radiator 51, further flows through the first heat exchanger 7, and then returns to the heat radiation pump 50.

The fan 52 is provided in proximity to the radiator 51.

The heating pump 60 is provided at the cylinder heating passage 6. The fuel cell 300 is constructed in such a manner that heating liquid sent out from the heating pump 60 flows through a flow passage in the hydrogen supply unit 200 while heating each MH cylinder 20, is then discharged from the hydrogen supply unit 200, flows through the second heat exchanger 8, and returns to the heating pump 60. Hydrogen is released from the hydrogen storage alloy in each MH cylinder 20 by heating. An example of heating liquid is antifreeze liquid.

The stack cooling passage 4, the radiator flow passage 5, the cylinder heating passage 6, the first heat exchanger 7 and the second heat exchanger 8 are covered with heat insulating material. The portions covered with the heat insulating material are indicated by thick lines in FIG. 1. The heat insulating material makes it possible to restrict heat transfer to/from the outside and to easily control the heat quantity.

The control unit 9 is provided with a CPU (Central Processing Unit) 90 configured to control operations of the respective components of the control unit 9, and the CPU 90 is connected with a ROM 91 and a RAM 92 via a bus.

The ROM 91 is a nonvolatile memory such as an electrically erasable programmable read-only memory (EEPROM), which stores an operating program 91a for the fuel cell 300 as well as an antifreeze program 91b according to the present embodiment.

Moreover, the antifreeze program 91b may be recorded on a recording medium such as a CD (Compact Disc)-ROM, which is a portable medium for computer-readable recording, a DVD (Digital Versatile Disc)-ROM, a BD (Blu-ray (registered trademark) Disc), a hard disc drive or a solid-state drive, so that the CPU 90 reads out the antifreeze program 91b from the recording medium and stores the antifreeze program 91b in the ROM 91.

Furthermore, the antifreeze program 91b according to the present disclosure may also be acquired from an external computer (not illustrated) that is connected to a communication network, and be stored in the ROM 91.

The RAM 92 is a memory such as a DRAM (Dynamic RAM) or an SRAM (Static RAM), and temporarily stores the operating program 91a as well as the antifreeze program 91b that are read out from the ROM 91 in the process of executing arithmetic processing by the CPU 90, and various data that are generated in the arithmetic processing executed by the CPU 90.

The control unit 9 is connected with the respective components of the cell body 100 and with the on-off valve 21 of the hydrogen supply unit 200, to control the operations of the respective components and the on-off valve 21. As for the connection between the control unit 9 and the components, only the portions necessary for the description of the present embodiment are illustrated.

A reaction occurring at the stack 1 is an exothermic reaction, and the stack 1 is cooled by cooling water, which flows through the stack cooling passage 4. Heat of cooling water, which has been discharged from the stack 1, is conducted to heat radiation liquid at the first heat exchanger 7, the heat radiation liquid radiates heat at the radiator 51, and the heat is radiated to the outside of the cell body 100 by the fan 52. Heat radiation liquid, which has been cooled at the radiator 51, is sent to the first heat exchanger 7.

Heat of cooling water, which has flown through the first heat exchanger 7 and has been guided into the second heat exchanger 8 in the stack cooling passage 4, is conducted to heating liquid at the second heat exchanger 8, and the heating liquid heats each MH cylinder 20 of the hydrogen supply unit 200, and releases hydrogen from the hydrogen storage alloy.

Cooling water, which has been cooled at the second heat exchanger 8, returns to the cooling pump 40 and is sent to the stack 1.

While the temperature of cooling water in the stack cooing passage 4 depends on the environmental temperature when power is not being generated, it is possible to maintain each MH cylinder 20 at a predetermined temperature by heating the heating liquid with the heater of the second heat exchanger 8.

It is also possible to send air, which includes heat generated at the stack 1, to the hydrogen supply unit 200 so as to heat each MH cylinder 20, without providing the cylinder heating passage 6. Furthermore, a heater may be provided in each MH cylinder 20 so as to directly heat the MH cylinder 20.

The cell body 100 is provided with the temperature sensor 63, which detects environmental temperature.

According to the present embodiment, the CPU 90 controls energization of the drain valves 28, 29 and the exhaust valves 61, 62 based on the environmental temperature detected by the temperature sensor 63.

The CPU 90 of the control unit 9 reads out the antifreeze program 91b from the ROM 91, and executes energization processing for freeze proofing.

Energization processing for freeze proofing will now be described below. Hereinafter, the energization processing will be referred to as the second energization processing in order to distinguish it from the energization processing performed in the case of discharging gas or water.

Figure 2:
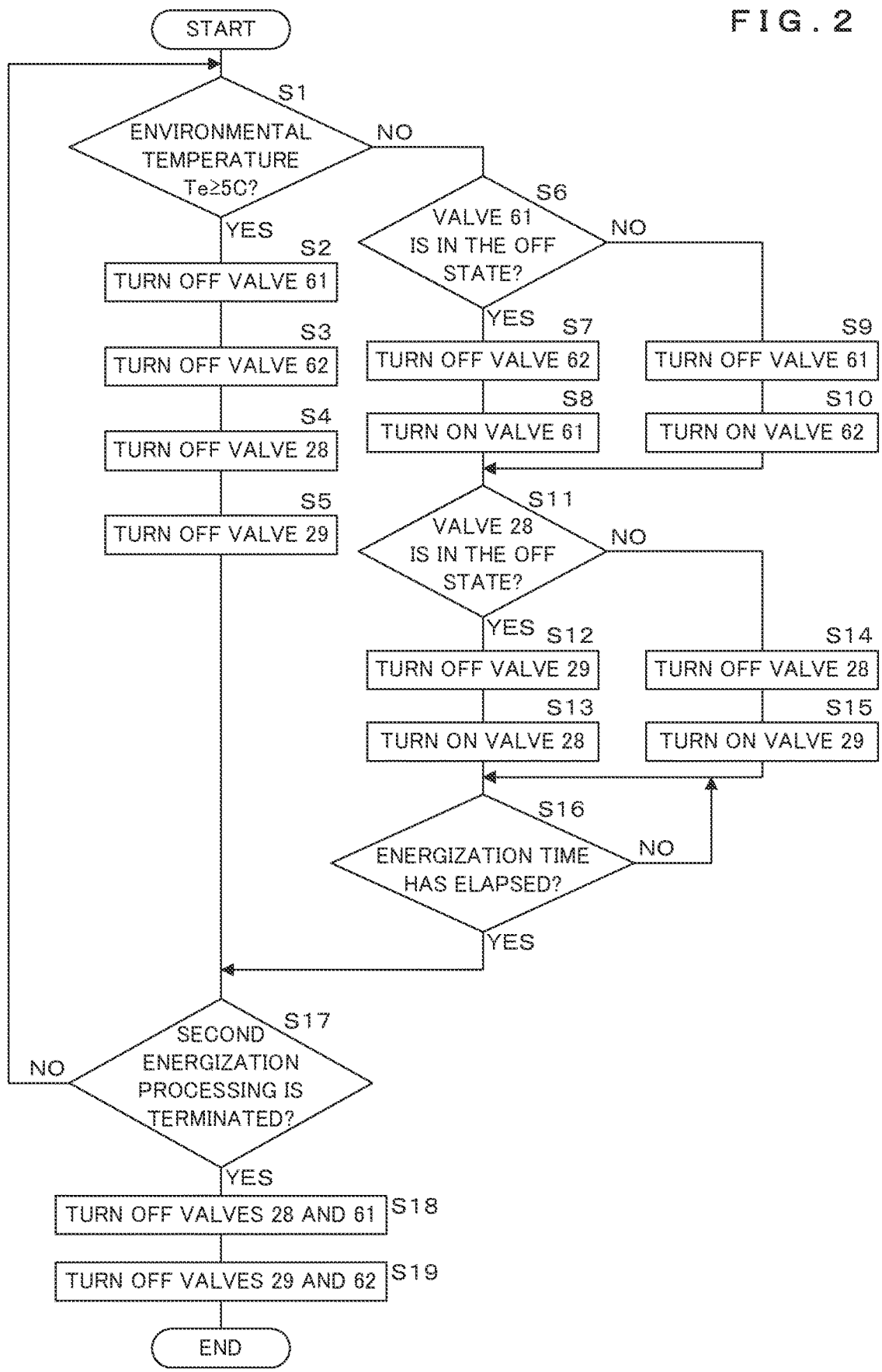
FIG. 2 is a flowchart illustrating second energization processing performed by a CPU.

FIG. 2 is a flowchart illustrating second energization processing performed by the CPU 90.

Initially, all of the exhaust valves 61, 62 and drain valves 28, 29 are in the state of energization off.

First, the CPU 90 determines whether or not the environmental temperature Te obtained from the temperature sensor 63 is 5° C. or higher (S1).

If it is determined that the environmental temperature Te is 5° C. or higher (S1: YES), the CPU 90 turns off the energization of the exhaust valve 61 (S2), turns off the energization of the exhaust valve 62 (S3), turns off the energization of the drain valve 28 (S4), turns off the energization of the drain valve 29 (S5), and proceeds to step S17.

If it is determined that the environmental temperature Te is not 5° C. or higher (S1: NO), the CPU 90 determines whether or not the energization of the exhaust valve 61 is in the off state (S6).

If it is determined that the energization of the exhaust valve 61 is in the off state (S6: YES), the CPU 90 turns off the energization of the exhaust valve 62 (S7), turns on the energization of the exhaust valve 61 (S8), and proceeds to step S11. Here, though the amount of current in the energization of the exhaust valve 61 may be an amount enough to fully open the exhaust valve 61, such an amount of current that is able to heat the exhaust valve 61 to at least prevent the exhaust valve 61 from being frozen may be sufficient. Moreover, the amount of current may be changed depending on the outside temperature. For example, if the outside temperature is not too low, such as −1° C. or −2° C., the amount of current may be small. The relationships between the outside temperature, amount of current and duration of energization, which will be described later, may be decided based on experimentation, and a table showing such relationships may be stored in the ROM 91. The duration of energization (hereinafter also referred to as energization time) may be changed in accordance with the outside temperature.

If it is determined that the energization of the exhaust valve 61 is not in the off state (S6: NO), the CPU 90 turns off the energization of the exhaust valve 61 (S9), turns on the energization of the exhaust valve 62 (S10), and proceeds to step S11. The amount of electricity distributed to the exhaust valve 62 is decided similarly to that for the exhaust valve 61. Moreover, the exhaust valve 62 may have a larger amount of current or a longer energization time compared to the exhaust valve 61, since it is located more toward the downstream side than the exhaust valve 61 and thus tends to be cooler.

The CPU 90 determines, at step S11, whether or not the energization of the exhaust valve 28 is in the off state.

If it is determined that the energization of the exhaust valve 28 is in the off state (S11: YES), the CPU 90 turns off the energization of the drain valve 29 (S12), turns on the energization of the drain valve 28 (S13), and proceeds to step S16. The amount of electricity distributed to the drain valve 28 is also decided similarly to that for the exhaust valve 61 or the like.

If it is determined that the energization of the drain valve 28 is not in the off state (S11: NO), the CPU 90 turns off the energization of the drain valve 28 (S14), turns on the energization of the drain valve 29 (S15), and proceeds to step S16. The amount of electricity distributed to the drain valve 29 is also decided similarly to that for the exhaust valve 61 or the like.

At step S16, the CPU 90 determines whether or not a predefined energization time has elapsed for a solenoid valve that is currently open. The energization time is defined in advance based on experimentation or the like, and is stored in the ROM 91. It is also possible to determine the elapse of the energization time individually for each of open solenoid valves.

If it is determined that the energization time has not elapsed (S16: NO), the CPU 90 repeats the determination processing.

If it is determined that the energization time has elapsed (S16: YES), the CPU 90 determines whether or not the second energization processing is terminated (S17). The determination on termination of the second energization processing is made based on, for example, whether or not the state where the environmental temperature Te is 5° C. or higher continues for a predetermine period of time, whether or not the total time of the second energization processing for the open solenoid valves exceeds a predetermined period of time, whether or not the number of times the second energization processing is performed for the open solenoid valves exceeds a predetermined number, and whether or not an instruction from the user to terminate the second energization processing is accepted.

If it is determined that the second energization processing is not terminated (S17: NO), the CPU 90 returns the processing to step S1.

If it is determined that the second energization processing is terminated (S17: YES), the CPU 90 turns off the energization of the drain valve 28 and the exhaust valve 61 (S18), then turns off the energization of the drain valve 29 and the exhaust valve 62 (S19), and terminates the second energization processing. In the case of terminating the second energization processing, the solenoid valves are closed in sequence from the upstream side in the discharging direction, leaving no pressure between the solenoid valves and thus effectively preventing any hydrogen leakage. Moreover, moisture is unlikely to remain, which favorably prevents freezing.

According to the present embodiment, in the case where the environmental temperature Te is 5° C. or higher which is not a freezing condition, it is not necessary to heat any of the exhaust valves 61, 62 and drain valves 28, 29, and therefore all the valves are maintained to be in the state of energization off.

In the case where the environmental temperature Te is lower than 5° C., first, the exhaust valve 61 is energized to be heated while the exhaust valve 62 is in the energization off state, and the drain valve 28 is energized to be heated while the drain valve 29 is in the energization off state. In the case where the environmental temperature Te continues to be lower than 5° C., the energization of the exhaust valve 61 is turned off and the exhaust valve 62 is energized to be heated, while the energization of the drain valve 28 is turned off and the drain valve 29 is energized to be heated.

Since the solenoid valves are switched when the energization time has elapsed, i.e., the energization of the solenoid valves aligned in series are alternately turned on, each of the solenoid valves has the duty ratio of 1:1.

In the present embodiment, as the environmental temperature Te is detected while the actual temperature of each solenoid valve is unknown, the solenoid valves aligned in series are alternately turned on to be energized so as to favorably prevent the solenoid valves from being frozen. Thus, power generation may favorably be performed.

While the solenoid valve on the upstream side in the gas or water discharging direction is energized first in the present embodiment, the order of energization is not limited thereto, but the solenoid valve on the downstream side may also be energized first.

Embodiment 2

Figure 3:
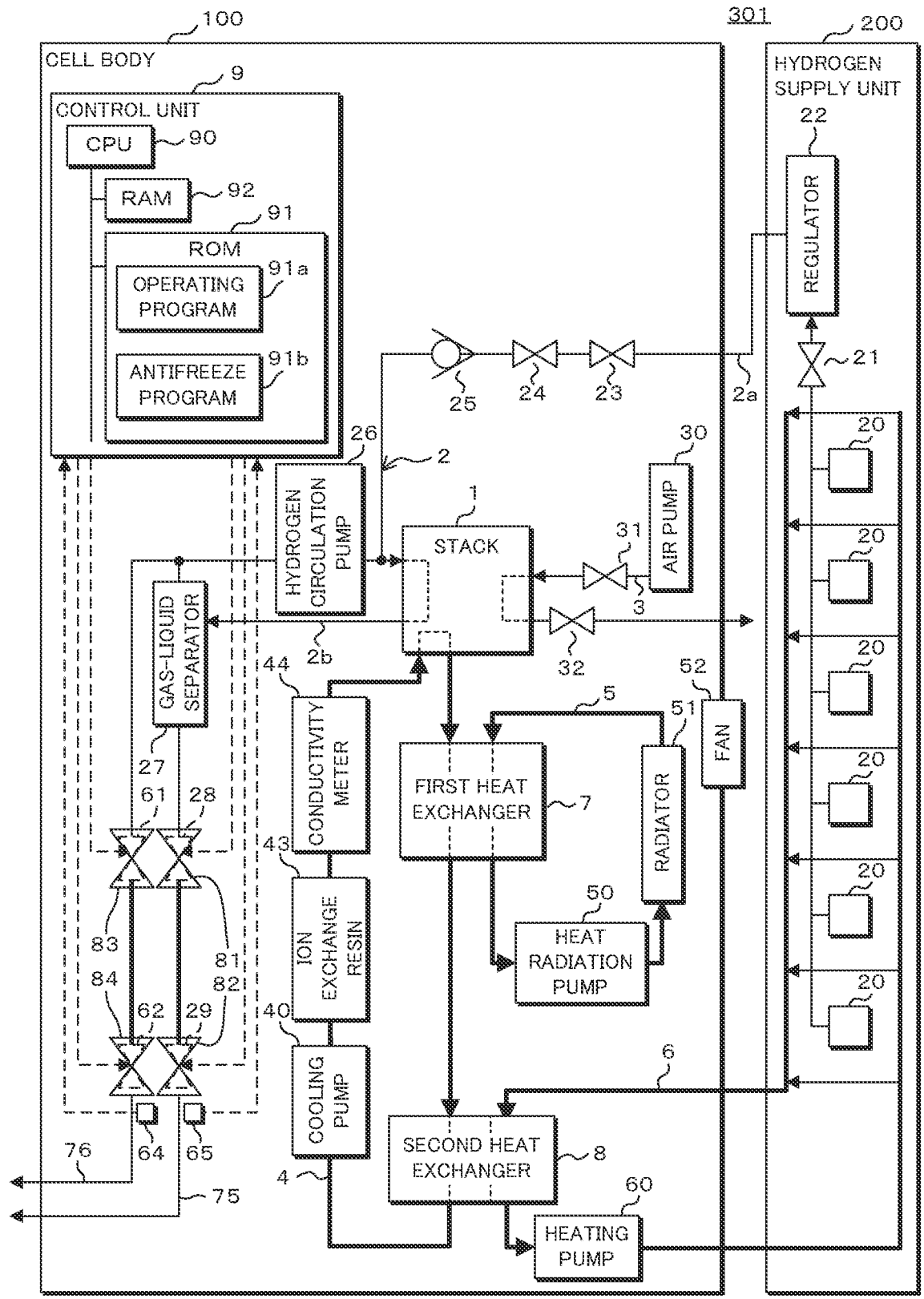
FIG. 3 is a block diagram illustrating a fuel cell according to Embodiment 2.

FIG. 3 is a block diagram illustrating a fuel cell 301 according to Embodiment 2. In FIG. 3, parts corresponding to those in FIG. 1 will be denoted by the same reference numerals and will not be described in detail.

The exhaust valve 62 and the drain valve 29 of the fuel cell 301 may be provided with temperature sensors 64 and 65, respectively.

Figure 4:
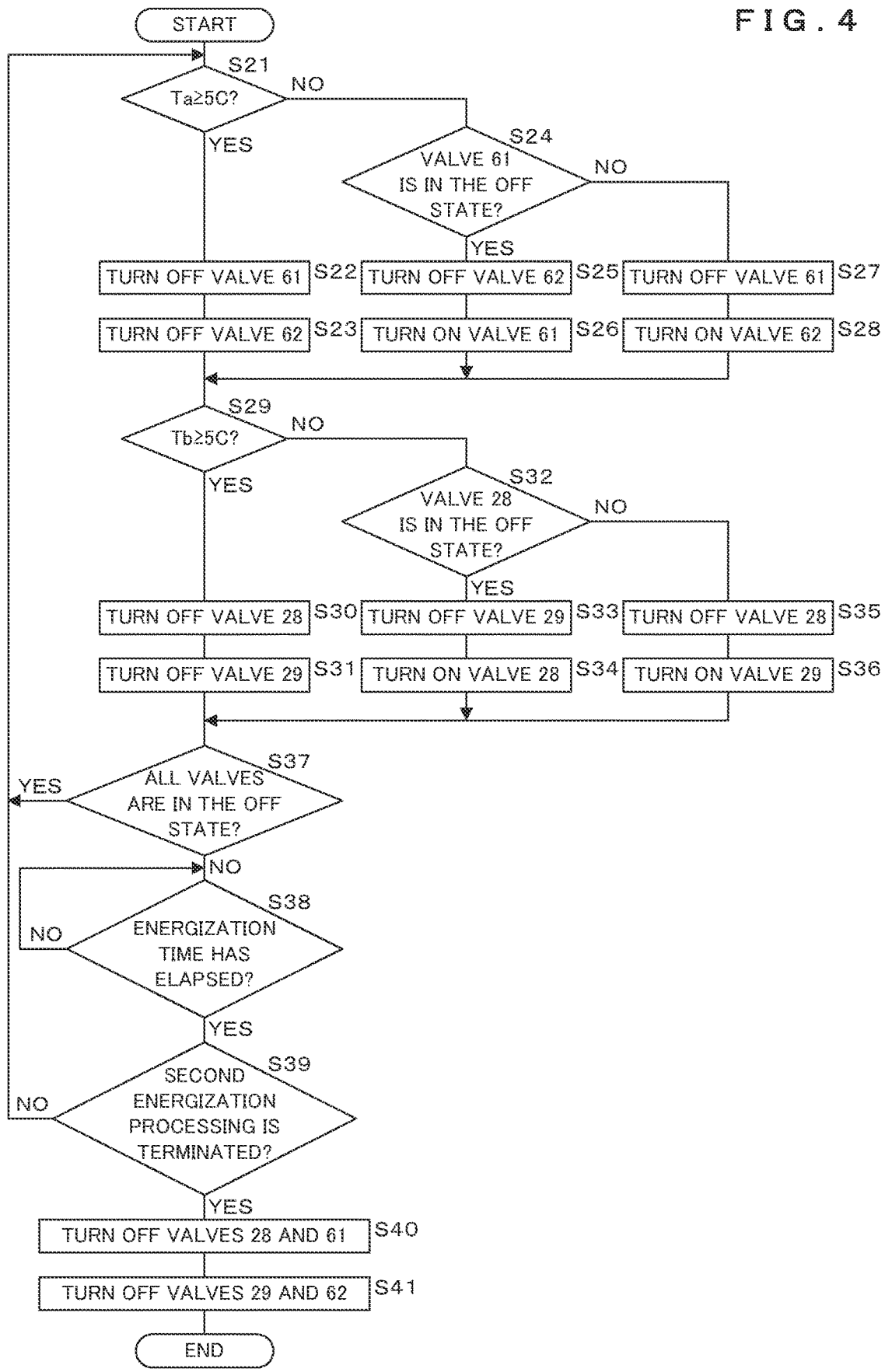
FIG. 4 is a flowchart illustrating second energization processing performed by a CPU.

FIG. 4 is a flowchart illustrating second energization processing performed by the CPU 90.

Initially, all of the exhaust valves 61, 62 and the drain valves 28, 29 are in the state of energization off.

First, the CPU 90 determines whether or not the temperature Ta of the exhaust valve 62 obtained from the temperature sensor 64 is 5° C. or higher (S21).

If it is determined that the temperature Ta is 5° C. or higher (S21: YES), the CPU 90 turns off the energization of the exhaust valve 61 (S22), turns off the energization of the exhaust valve 62 (S23), and proceeds to step S29.

If it is determined that the temperature Ta is not 5° C. or higher (S21: NO), the CPU 90 determines whether or not the energization of the exhaust valve 61 is in the off state (S24).

If it is determined that the energization of the exhaust valve 61 is in the off state (S24: YES), the CPU 90 turns off the energization of the exhaust valve 62 (S25), turns on the energization of the exhaust valve 61 (S26), and proceeds to step S29. Here, though the amount of current in the energization of the exhaust valve 61 may be an amount enough to fully open the exhaust valve 61, such an amount of current that is able to heat the exhaust valve 61 to at least prevent the exhaust valve 61 from being frozen may be sufficient. Moreover, the amount of current may be changed depending on the temperature of the exhaust valve 62. For example, if the temperature of the exhaust valve 62 is not too low, such as −1° C. or −2° C., the amount of current may be small. The relationships between the temperature of the exhaust valve 62, an amount of current supplied to the exhaust valve 61 and energization time may be decided based on experimentation, and a table showing such relationships may be stored in the ROM 91.

If it is determined that the energization of the exhaust valve 61 is not in the off state (S24: NO), the CPU 90 turns off the energization of the exhaust valve 61 (S27), turns on the energization of the exhaust valve 62 (S28), and proceeds to step S29. The amount of electricity distributed to the exhaust valve 62 is decided similarly to that for the exhaust valve 61.

The CPU 90 determines, at step S29, whether or not the temperature Tb of the drain valve 29 obtained from the temperature sensor 65 is 5° C. or higher.

If it is determined that the temperature Tb is 5° C. or higher (S29: YES), the CPU 90 turns off the energization of the drain valve 28 (S30), turns off the energization of the drain valve 29 (S31), and proceeds to step S37.

If it is determined that the temperature Tb is not 5° C. or higher (S29: NO), the CPU 90 determines whether or not the energization of the drain valve 28 is in the off state (S32).

If it is determined that the energization of the drain valve 28 is in the off state (S32: YES), the CPU 90 turns off the energization of the drain valve 29 (S33), turns on the energization of the drain valve 28 (S34), and proceeds to step S37. The amount of electricity distributed to the drain valve 28 is also decided similarly to that for the exhaust valve 61.

If it is determined that the energization of the drain valve 28 is not in the off state (S32: NO), the CPU 90 turns off the energization of the drain valve 28 (S35), turns on the energization of the drain valve 29 (S36), and proceeds to step S37. The amount of electricity distributed to the drain valve 29 is also decided similarly to the exhaust valve 61 or the like.

The CPU 90 determines, at step S37, whether or not all of the exhaust valves 61, 62 and the drain valves 28, 29 are in the off state. If it is determined that all of the valves are in the off state (S37: YES), the CPU 90 returns the processing to step S21.

If it is determined that not all of the valves are in the off state (S37: NO), the CPU 90 determines whether or not a prescribed energization time has elapsed for a solenoid valve that is currently open (S38). It is also possible to determine the elapse of the energization time individually for each of open solenoid valves. If it is determined that the energization time has not elapsed (S38: NO), the CPU 90 repeats the determination processing.

If it is determined that the energization time has elapsed (S38: YES), the CPU 90 determines whether or not the second energization processing is terminated (S39). The determination on termination of the second energization processing is made based on, for example, whether or not the state where the temperature Ta and Tb are 5° C. or higher continues for a predetermine period of time, whether or not the total time of the second energization processing for open solenoid valves exceeds a predetermined period of time, whether or not the number of times the second energization processing is performed for the open solenoid valves exceeds a predetermined number, and whether or not an instruction from the user to terminate the second energization processing is accepted.

If it is determined that the second energization processing is not terminated (S39: NO), the CPU 90 returns the processing to step S21.

If it is determined that the second energization processing is terminated (S39: YES), the CPU 90 turns off the energization of the drain valve 28 and the exhaust valve 61 (S40), then turns off the energization of the drain valve 29 and the exhaust valve 62 (S41), and terminates the second energization processing.

According to the present embodiment, in the case where the temperature Ta and Tb are 5° C. or higher which is not a freezing condition, it is not necessary to heat any of the exhaust valves 61, 62 and drain valves 28, 29, and therefore all the valves are maintained to be in the state of energization off.

In the case where the temperature Ta of the exhaust valve 62 is lower than 5° C., first, the exhaust valve 61 is energized to be heated while the exhaust valve 62 is in the energization off state. In the case where the temperature Ta continues to be lower than 5° C., then the energization of the drain valve 61 is turned off and the drain valve 62 is energized to be heated. Likewise, in the case where the temperature Tb of the drain valve 29 is lower than 5° C., first, the drain valve 28 is energized to be heated while the drain valve 29 is in the energization off state. In the case where the temperature Tb continues to be lower than 5° C., the energization of the drain valve 28 is turned off to energize and heat the drain valve 29.

In the present embodiment, the temperature sensor is provided only at the solenoid valve on the downstream side in the gas and water discharging direction, so that the solenoid valve on the upstream side where no temperature sensor is provided is energized first and heated. If the solenoid valve where the temperature sensor is provided is heated first, the temperature of the solenoid valve where no temperature sensor is provided may be lowered, which may freeze the solenoid valve. If the solenoid valve on the upstream side is heated, the heated gas or water flows through the solenoid valve on the downstream side while heating the solenoid valve on the downstream side.

As the energization time elapses, the energization of the solenoid valves aligned in series are alternately turned on, so that each valve has the duty ratio of 1:1.

Embodiment 3

Figure 5:
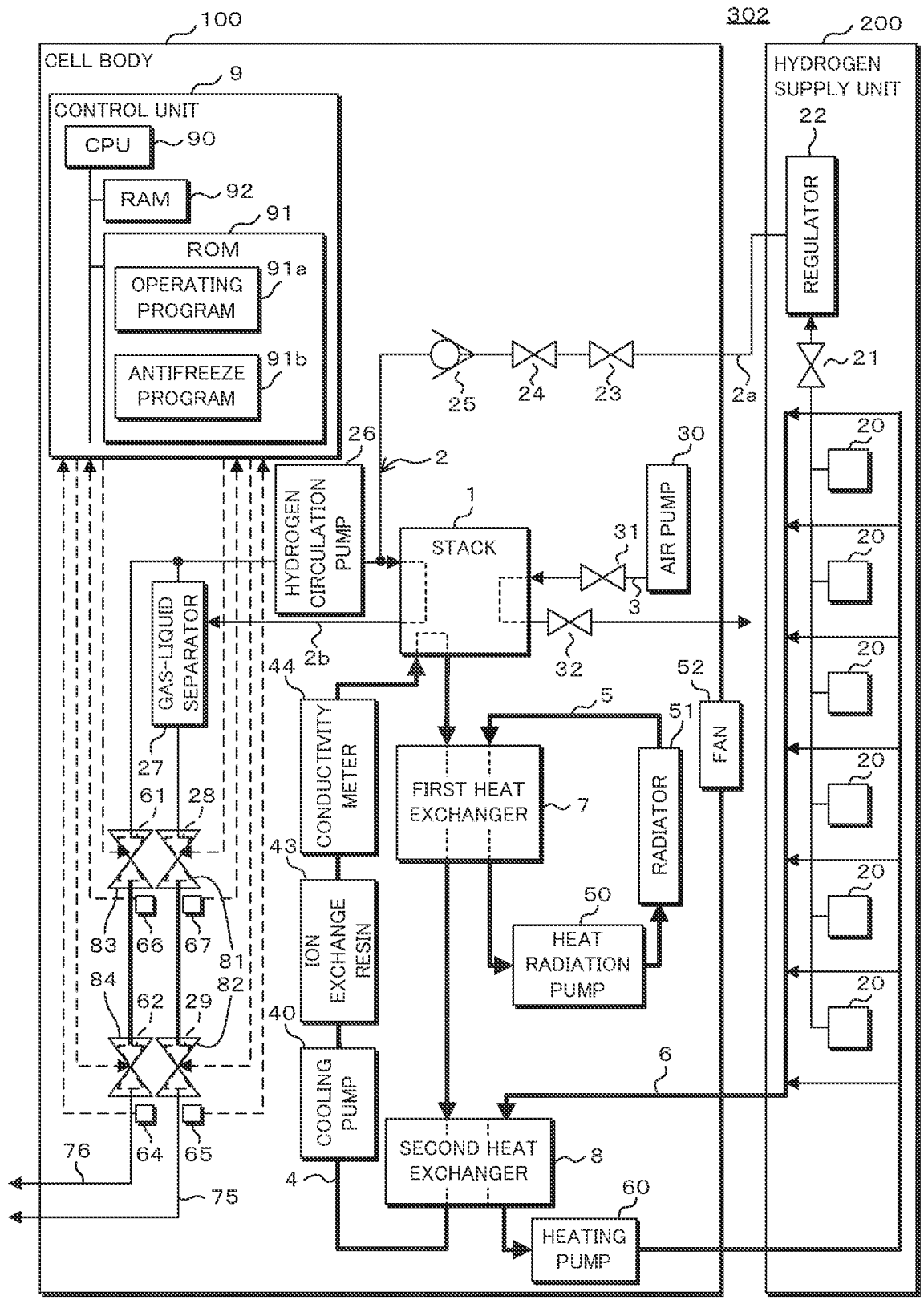
FIG. 5 is a block diagram illustrating a fuel cell according to Embodiment 3.

FIG. 5 is a block diagram illustrating a fuel cell 302 according to Embodiment 3. In FIG. 5, parts corresponding to those in FIG. 3 will be denoted by the same reference numerals and will not be described in detail.

As in the fuel cell 301, the exhaust valve 62 and the drain valve 29 are provided with temperature sensors 64 and 65, respectively, while the exhaust valve 61 and the drain valve 28 are provided with the temperature sensors 66 and 67, respectively.

Figure 6:
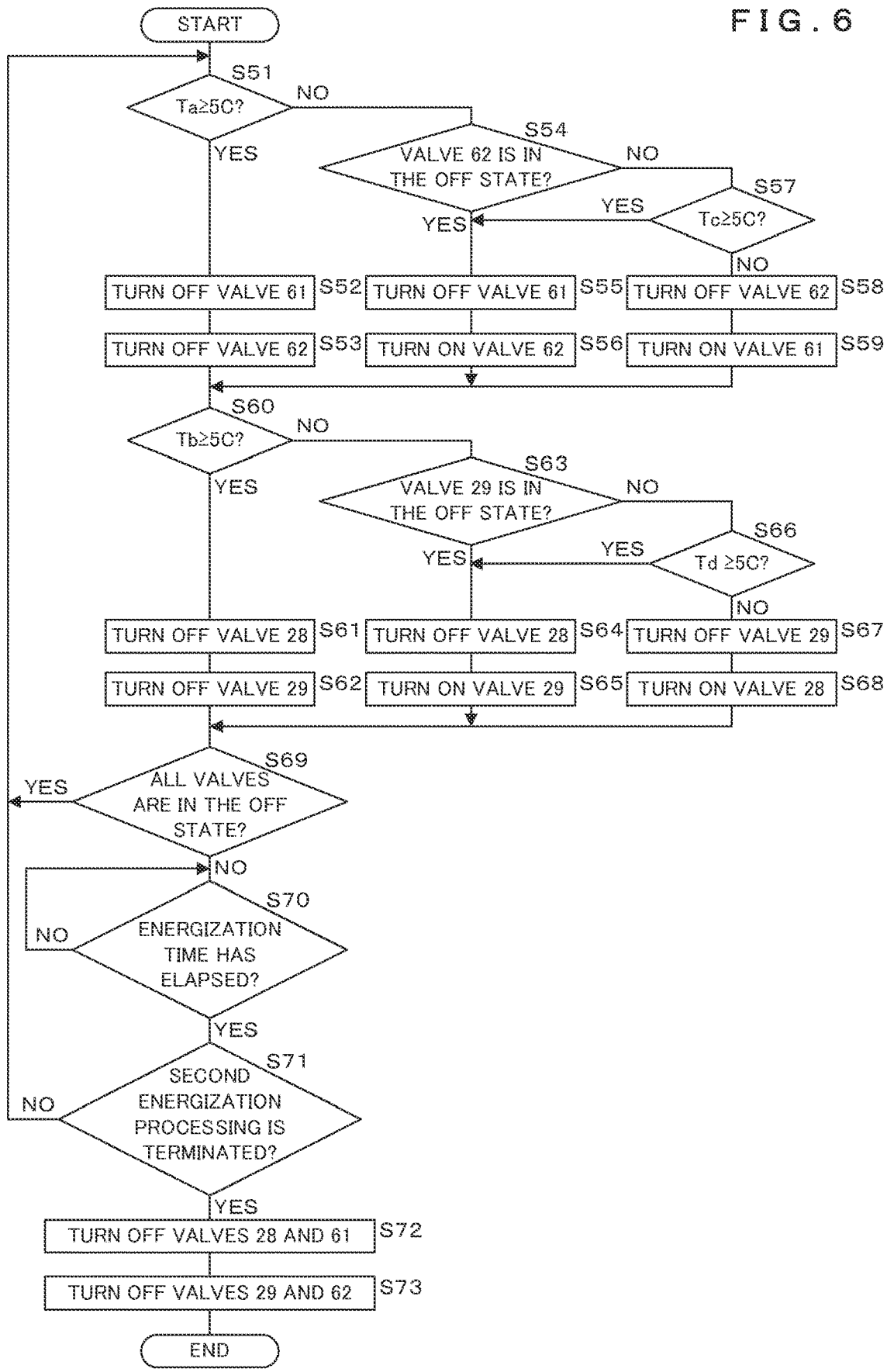
FIG. 6 is a flowchart illustrating second energization processing performed by a CPU.

FIG. 6 is a flowchart illustrating second energization processing performed by the CPU 90.

Initially, all of the exhaust valves 61, 62 and drain valves 28, 29 are in the state of energization off.

First, the CPU 90 determines whether or not the temperature Ta of the exhaust valve 62 obtained from the temperature sensor 64 is 5° C. or higher (S51).

If it is determined that the temperature Ta is 5° C. or higher (S51: YES), the CPU 90 turns off the energization of the exhaust valve 61 (S52), turns off the energization of the exhaust valve 62 (S53), and proceeds to step S60.

If it is determined that the temperature Ta is not 5° C. or higher (S51: NO), the CPU 90 determines whether or not the energization of the exhaust valve 62 is in the off state (S54).

If it is determined that the energization of the exhaust valve 62 is in the off state (S54: YES), the CPU 90 turns off the energization of the exhaust valve 61 (S55), turns on the energization of the exhaust valve 62 (S26), and proceeds to step S60. Here, though the amount of current in the energization of the exhaust valve 62 may be an amount enough to fully open the exhaust valve 62, such an amount of current that is able to heat the exhaust valve 62 to at least prevent the exhaust valve 62 from being frozen may be sufficient. Moreover, the amount of current may be changed depending on the temperature of the exhaust valve 62. For example, if the temperature of the exhaust valve 62 is not too low, such as −1° C. or −2° C., the amount of current may be small. The relationships between the temperature of the exhaust valve 62, the amount of current supplied to the exhaust valve 62 and the energization time may be decided based on experimentation, and a table showing such relationships may be stored in the ROM 91.

If it is determined that the energization of the exhaust valve 62 is not in the off state (S54: NO), the CPU 90 determines whether or not the temperature Tc of the exhaust valve 61 obtained from the temperature sensor 66 is 5° C. or higher (S57).

If it is determined that the temperature Tc is 5° C. or higher (S57: YES), the CPU 90 proceeds to step S55.

If it is determined that the temperature Tc is not 5° C. or higher (S57: NO), the CPU 90 turns off the energization of the exhaust valve 62 (S58), turns on the energization of the exhaust valve 61 (S59), and proceeds to step S60. The amount of electricity distributed to the exhaust valve 61 is also decided similarly to the amount of electricity distributed to the exhaust valve 62.

The CPU 90 determines, at step S60, whether or not the temperature Tb of the drain valve 29 obtained from the temperature sensor 65 is 5° C. or higher.

If it is determined that the temperature Tb is 5° C. or higher (S60: YES), the CPU 90 turns off the energization of the drain valve 28 (S61), turns off the energization of the drain valve 29 (S62), and proceeds to step S69.

If it is determined that the temperature Tb is not 5° C. or higher (S60: NO), the CPU 90 determines whether or not the energization of the drain valve 29 is in the off state (S63).

If it is determined that the energization of the drain valve 29 is in the off state (S63: YES), the CPU 90 turns off the energization of the drain valve 28 (S64), turns on the energization of the drain valve 29 (S65), and proceeds to step S69. The amount of electricity distributed to the drain valve 29 is also decided similarly to the amount of electricity distributed to the exhaust valve 62 or the like.

If it is determined that the energization of the drain valve 29 is not in the off state (S63: NO), the CPU 90 determines whether or not the temperature Td of the drain valve 28 obtained from the temperature sensor 67 is 5° C. or higher (S66).

If it is determined that the temperature Td is 5° C. or higher (S66: YES), the CPU 90 proceeds to step S64.

If it is determined that the temperature Td is not 5° C. or higher (S66: NO), the CPU 90 turns off the energization of the drain valve 29 (S67), turns on the energization of the drain valve 28 (S68), and proceeds to step S69. The amount of electricity distributed to the drain valve 28 is also decided similarly to the amount of electricity distributed to the drain valve 29.

The CPU 90 determines, at step S69, whether or not all of the exhaust valves 61, 62 and the drain valves 28, 29 are in the off state. If it is determined that all of the valves are in the off state (S69: YES), the CPU 90 returns the processing to step S51.

If it is determined that not all of the valves are in the off state (S69: NO), the CPU 90 determines whether or not a prescribed energization time has elapsed for a solenoid valve that is currently open (S70). It is also possible to determine the elapse of the energization time individually for each of the open solenoid valves.

If it is determined that the energization time has not elapsed (S70: NO), the CPU 90 repeats the determination processing.

If it is determined that the energization time has elapsed (S70: YES), the CPU 90 determines whether or not the second energization processing is terminated (S71). The determination on termination of the second energization processing is made based on, for example, whether or not the state where the temperatures Ta, Tb, Tc and Td are 5° C. or higher continues for a predetermine period of time, whether or not the total time of the second energization processing for the open solenoid valves exceeds a predetermined period of time, whether or not the number of times the second energization processing is performed for the open solenoid valves exceeds a predetermined number, and whether or not an instruction from the user to terminate the second energization processing is accepted.

If it is determined that the second energization processing is not terminated (S71: NO), the CPU 90 returns the processing to step S51.

If it is determined that the second energization processing is terminated (S71: YES), the CPU 90 turns off the energization of the drain valve 28 and the exhaust valve 61 (S72), then turns off the energization of the drain valve 29 and the exhaust valve 62 (S73), and terminates the second energization processing.

According to the present embodiment, in the case where the temperatures Ta and Tb are 5° C. or higher, all the solenoid valves are maintained to be in the state of energization off.

In the case where the temperature Ta of the exhaust valve 62 is lower than 5° C., first, the exhaust valve 62 is energized to be heated while the exhaust valve 61 is in the state of energization off. In the case where the temperature Ta continues to be lower than 5° C., the energization of the exhaust valve 62 is maintained when the temperature Tc of the exhaust valve 61 is 5° C. or higher. Thus, the exhaust valve 62 may remain energized until it is warmed up. In the case where the temperature Tc of the exhaust valve 61 is lower than 5° C., the energization of the exhaust valve 62 is turned off and the exhaust valve 61 is energized to be heated.

In this case also, the gas that has flown through the exhaust valve 61 warms up the exhaust valve 62.

Likewise, in the case where the temperature Tb of the drain valve 29 is lower than 5° C., first, the drain valve 29 is energized to be heated while the drain valve 28 is in the state of energization off. In the case where the temperature Tb continues to be lower than 5° C., the energization of the drain valve 29 is maintained when the temperature Td of the drain valve 28 is 5° C. or higher. In the case where the temperature Td of the drain valve 28 is lower than 5° C., the energization of the drain valve 29 is turned off and the drain valve 28 is energized to be heated.

In the present embodiment, the temperature sensor is provided at both of the solenoid valves on the upstream side and downstream side in the gas and water discharging direction, so that the solenoid valve on the downstream side that is likely to be frozen is energized first and heated.

The solenoid valves aligned in series are not alternately energized, resulting in increased energization time of the solenoid valve on the downstream side that is likely to be frozen, each solenoid valve not having the duty ratio of 1:1.

According to the present embodiment, the temperature of each solenoid valve is detected to energize a solenoid valve as needed, thereby preventing supply of unnecessary electricity.

Embodiment 4

Figure 7:
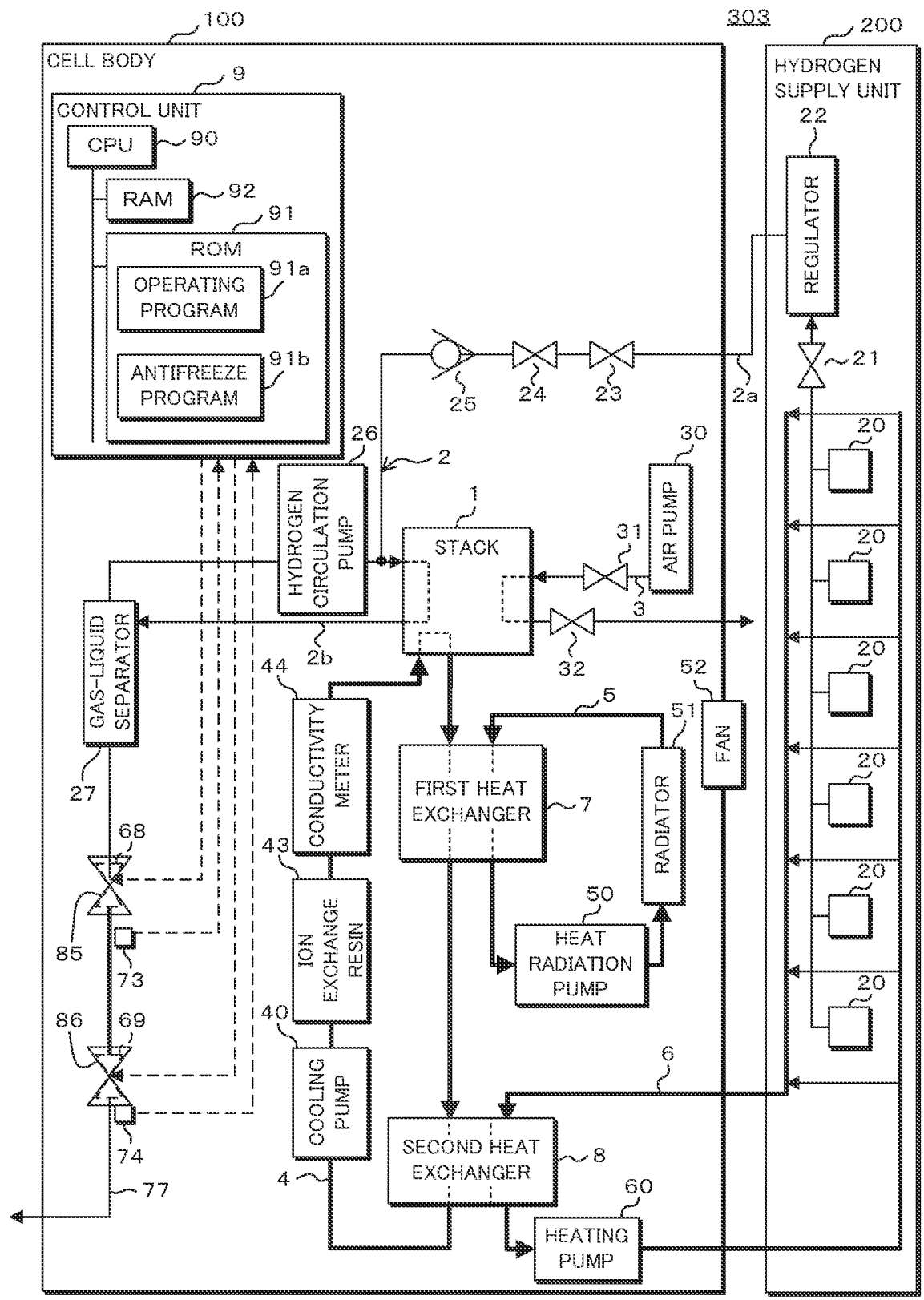
FIG. 7 is a block diagram illustrating a fuel cell according to Embodiment 4.

FIG. 7 is a block diagram illustrating a fuel cell 303 according to Embodiment 4. In FIG. 7, parts corresponding to those in FIG. 5 will be denoted by the same reference numerals and will not be described in detail.

In the fuel cell 303, an exhaust drain passage 77 is connected with a gas-liquid separator 27 at the lower side, and is provided with an exhaust drain valve 68 and an exhaust drain valve 69 arranged in series. The exhaust drain valves 68 and 69 are provided with temperature sensors 73 and 74, respectively. The exhaust drain valves 68 and 69 are covered with heat insulating materials 85 and 86, respectively. A portion of the exhaust drain passage 77 between the exhaust drain valves 68 and 69 is also covered with a heat insulating material. The portions covered with the heat insulating material are indicated by thick lines in FIG. 7. Though not required, a heat insulating material may preferably be employed as it may retain the heat generated by energization of the exhaust drain valve 68 or 69 in the case of performing the second energization processing, and thus may more favorably prevent freezing. It is also possible to cover the entire exhaust drain passage 77 with a heat insulating material. According to the present embodiment, water is stored in the gas-liquid separator 27 and if the amount of stored water reaches a predetermined value or higher, or if an amount of impurities in the gas is increased, the exhaust drain valve 68 and the exhaust drain valve 69 are simultaneously opened so as to discharge water and gas at the same time.

Figure 8:
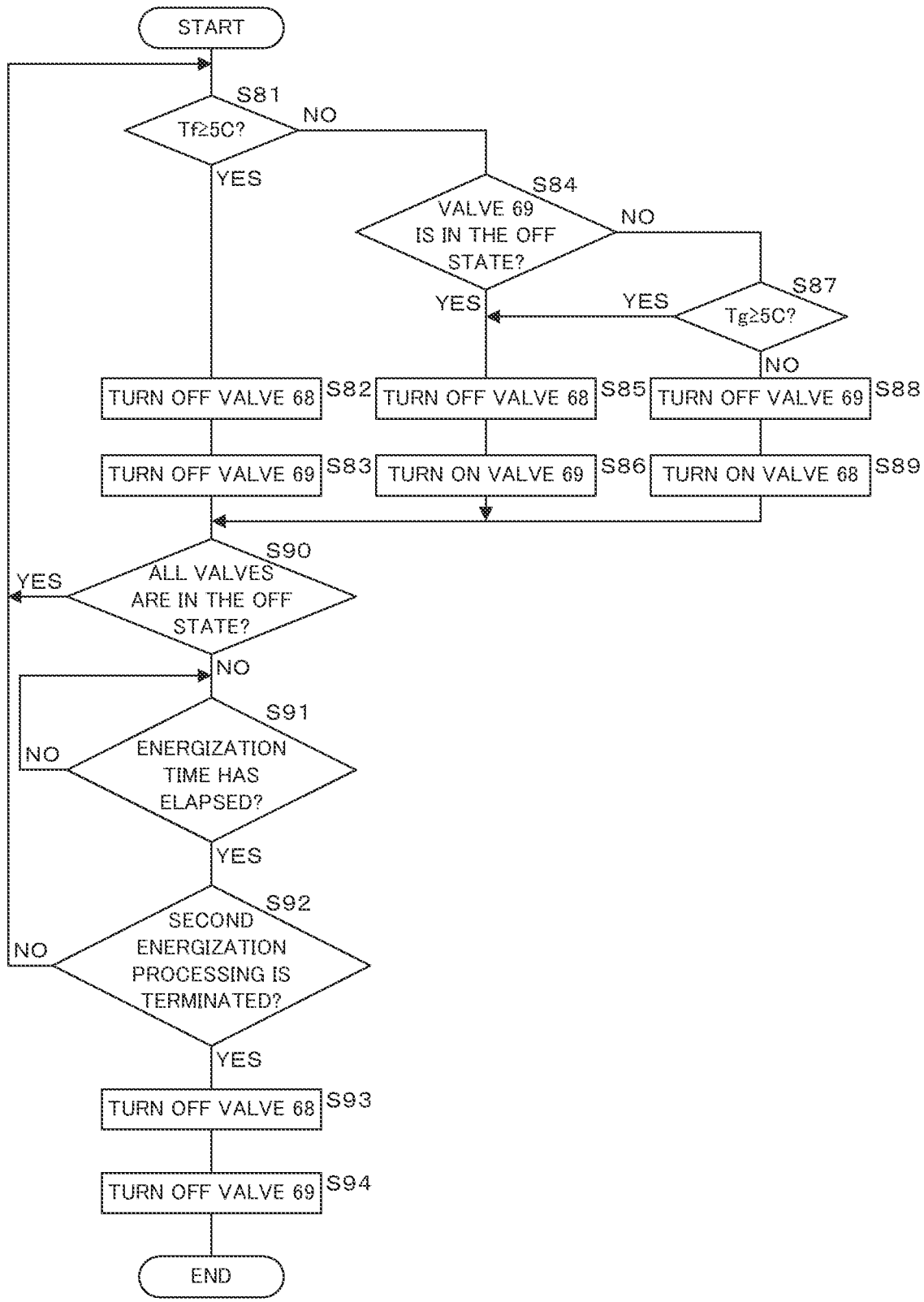
FIG. 8 is a flowchart illustrating second energization processing performed by a CPU.

FIG. 8 is a flowchart illustrating second energization processing performed by the CPU 90.

Initially, the exhaust drain valve 68 and the exhaust drain valve 69 are both in the state of energization off.

First, the CPU 90 determines whether or not the temperature Tf of the exhaust drain valve 69 obtained from the temperature sensor 74 is 5° C. or higher (S81).

If it is determined that the temperature Tf is 5° C. or higher (S81: YES), the CPU 90 turns off the energization of the exhaust drain valve 68 (S82), turns off the energization of the exhaust drain valve 69 (S83), and proceeds to step S90.

If it is determined that the temperature Tf is not 5° C. or higher (S81: NO), the CPU 90 determines whether or not the energization of the exhaust drain valve 69 is in the off state (S84).

If it is determined that the energization of the exhaust drain valve 69 is in the off state (S84: YES), the CPU 90 turns off the energization of the exhaust drain valve 68 (S85), turns on the energization of the exhaust drain valve 69 (S86), and proceeds to step S90. Here, though the amount of current in the energization of the exhaust drain valve 69 may be an amount enough to fully open the exhaust drain valve 69, such an amount of current that is able to heat the exhaust drain valve 69 to at least prevent the exhaust drain valve 69 from being frozen may be sufficient. Moreover, the amount of current may be changed depending on the temperature of the exhaust drain valve 69. For example, if the temperature of the exhaust drain valve 69 is not too low, such as −1° C. or −2° C., the amount of current may be small. The relationships between the temperature of the exhaust drain valve 69, the amount of current supplied to the exhaust drain valve 69 and the energization time may be decided based on experimentation, and a table showing such relationships may be stored in the ROM 91.

If it is determined that the energization of the exhaust drain valve 69 is not in the off state (S84: NO), the CPU 90 determines whether or not the temperature Tg of the exhaust drain valve 68 obtained from the temperature sensor 73 is 5° C. or higher (S87).

If it is determined that the temperature Tg is 5° C. or higher (S87: YES), the CPU 90 proceeds to step S85.

If it is determined that the temperature Tg is not 5° C. or higher (S87: NO), the CPU 90 turns off the energization of the exhaust drain valve 69 (S88), turns on the energization of the exhaust drain valve 68 (S89), and proceeds to step S90. The amount of electricity distributed to the exhaust drain valve 68 is also decided similarly to the amount of electricity distributed to the exhaust drain valve 68.

The CPU 90 determines, at step S90, whether or not both of the exhaust drain valves 68 and 69 are in the off state. If it is determined that both of the exhaust drain valves 68 and 69 are in the off state (S90: YES), the CPU 90 returns the processing to step S81.

If it is determined that not both of the exhaust drain valves 68 and 69 are in the off state (S90: NO), the CPU 90 determines whether or not a prescribed energization time has elapsed for a solenoid valve that is currently open (S91). If it is determined that the energization time has not elapsed (S91: NO), the CPU 90 repeats the determination processing.

If it is determined that the energization time has elapsed (S91: YES), the CPU 90 determines whether or not the second energization processing is terminated (S92). The determination on termination of the second energization processing is made based on, for example, whether or not the state where the temperatures Tf and Tg are 5° C. or higher continues for a predetermine period of time, whether or not the total time of the second energization processing for an open solenoid valve exceeds a predetermined period of time, whether or not the number of times the second energization processing is performed for an open solenoid valve exceeds a predetermined number, and whether or not an instruction from the user to terminate the second energization processing is accepted.

If it is determined that the second energization processing is not terminated (S92: NO), the CPU 90 returns the processing to step S81.

If it is determined that the second energization processing is terminated (S92: YES), the CPU 90 turns off the energization of the exhaust drain valve 68 (S93), then turns off the energization of the exhaust drain valve 69 (S94), and terminates the second energization processing.

According to the present embodiment, in the case where the temperatures Tf and Tg are 5° C. or higher which is not a freezing condition, it is not necessary to heat any of the exhaust drain valves 68 and 69, and therefore both of the valves are maintained to be in the state of energization off.

In the case where the temperature Tf of the exhaust drain valve 69 is lower than 5° C., first, the exhaust drain valve 69 is energized to be heated while the exhaust drain valve 68 is in the state of energization off. In the case where the temperature Tf continues to be lower than 5° C., the energization of the exhaust drain valve 69 is maintained when the temperature Tg of the exhaust drain valve 68 is 5° C. or higher. Thus, the exhaust drain valve 69 may remain energized until it is warmed up. In the case where the temperature Tg of the exhaust drain valve 68 is lower than 5° C., the energization of the exhaust drain valve 69 is turned off, and the exhaust drain valve 68 is energized to be heated. In this case also, the gas that has flown through the exhaust drain valve 68 warms up the exhaust drain valve 69.

In the present embodiment, the temperature sensor is provided at both of the valves on the upstream side and downstream side in the gas and water discharging direction, so that the valve on the downstream side that is easily frozen is energized first and heated.

As described above, in a fuel cell according to the present disclosure comprising a power generation unit configured to generate electricity by reacting hydrogen and oxygen, a solenoid valve discharging gas or water emitted from the power generation unit to the outside, and a control unit configured to control energization of the solenoid valve, a plurality of the solenoid valves are aligned along a direction in which the gas or the water is discharged, a temperature detection unit is provided that detects the temperature of a solenoid valve on the downstream side in the discharging direction, and if the temperature of the solenoid valve is equal to or lower than a predetermined value, the control unit energizes a solenoid valve on a more upstream side in the discharging direction than the solenoid valve and closes at least one of the other solenoid valves aligned with the energized solenoid valve.

In the present disclosure, the temperature detection unit is provided only at the solenoid valve on the downstream side in the gas or water discharging direction, so that the solenoid valve on the upstream side where no temperature detection unit is provided is energized first and heated. If the solenoid valve where the temperature detection unit is provided is heated first, the temperature of the solenoid valve where no temperature detection unit is provided may be lowered, which may freeze the solenoid valve. If the solenoid valve on the upstream side is heated, the heated gas or water flows through the solenoid valve on the downstream side while heating the solenoid valve on the downstream side.

Since at least one of the aligned solenoid valves is closed, there is no risk of a hydrogen leak.

Thus, power generation may favorably be performed.

In a fuel cell according to the present disclosure comprising: a power generation unit configured to generate electricity by reacting hydrogen and oxygen; a solenoid valve for discharging gas or water emitted from the power generation unit to the outside; and a control unit configured to control energization of the solenoid valve, a plurality of the solenoid valves are aligned along a direction in which the gas or the water is discharged, a plurality of temperature detection units configured to detect the temperature of each solenoid valve is provided, and if the temperature of a solenoid valve on the downstream side in the discharging direction is equal to or lower than the first predetermined value, the control unit energizes the solenoid valve and closes at least one of the other solenoid valves aligned with the energized solenoid valve.

In the present disclosure, the temperature detection unit is provided at both of the solenoid valves on the upstream side and downstream side in the gas and water discharging direction, so that the solenoid valve on the downstream side that is easily frozen is energized first and heated.

This may favorably prevent freezing. The temperature of each solenoid valve is then detected and a solenoid valve is energized as needed, which prevents supply of unnecessary electricity.

At least one of the aligned solenoid valves is closed, thereby eliminating the risk of a hydrogen leak.

Thus, power generation may favorably be performed.

In the fuel cell according to the present disclosure described above, in the case where the solenoid valve is energized, the control unit continues energization if the temperature of the solenoid valve is equal to or lower than the first predetermined value and the temperature of a solenoid valve on a more upstream side in the discharging direction than the energized solenoid valve is equal to or higher than the second predetermined value.

According to an aspect of the present disclosure, in the case where the temperature of a solenoid valve on the downstream side in the discharging direction is equal to or lower than the first predetermined value and the temperature of a solenoid valve on a more upstream side in the discharging direction than the solenoid valve on the downstream side is equal to or higher than the second predetermined value and thus no risk of the solenoid valve on the upstream side being frozen is present, the solenoid valve on the downstream side continues being energized so as to favorably prevent it from being frozen.

In the fuel cell as described above, the control unit switches a solenoid valve to be energized if a predetermined time elapses.

According to an aspect of the present disclosure, a solenoid valve is switched so that a solenoid valve not being energized may be heated to prevent it from being frozen. The solenoid valve that has been energized is closed by stopping energization thereof, which may prevent a hydrogen leak.

In the fuel cell according to an aspect of the present disclosure as described above, in the case of performing the energization processing, the control unit supplies current having the same polarity as that of the drive current in the energization processing at the time of discharging the gas or the water to the outside to the solenoid valve.

According to an aspect of the present disclosure, no special solenoid valve is necessary and regular drive current allows the solenoid valve to operate, eliminating the need for a special electric circuit.

In the fuel cell according to the present disclosure as described above, in the case of terminating the energization processing, the control unit closes the solenoid valves in sequence from the upstream side in the discharging direction.

According to an aspect of the present disclosure, no pressure remains between solenoid valves, which favorably prevents a hydrogen leak. Moreover, moisture is unlikely to remain as well, which favorably prevents freezing.

In the fuel cell according to an aspect of the present disclosure, the solenoid valve is covered with a heat insulating material.

According to an aspect of the present disclosure, the heat insulating material may retain the heat generated by energizing the solenoid valve, which more favorably prevents freezing.

A control method according to the present disclosure for a fuel cell comprising: a power generation unit configured to generate electricity by reacting hydrogen and oxygen; a plurality of aligned solenoid valves for discharging gas or water emitted from the power generation unit to the outside; a control unit configured to control energization of the solenoid valve; and a temperature detection unit configured to detect the temperature of a solenoid valve on a downstream side in the discharging direction, comprises detecting the temperature of the solenoid valve, and if the temperature of the solenoid valve is equal to or lower than a predetermined value, energizing a solenoid valve on a more upstream side in the discharging direction than the solenoid valve on the downstream side and closing at least one of the other solenoid valves aligned with the energized solenoid valve.

In the present disclosure, the temperature detection unit is provided only at the solenoid valve on the downstream side, so that the solenoid valve on the upstream side where no temperature detection unit is provided is energized first and heated. If the solenoid valve on the upstream side is heated, the heated gas or water flows through a valve on the downstream side while heating the solenoid valve on the downstream side.

Since at least one of the aligned solenoid valves is closed, there is no risk of a hydrogen leak.

Thus, power generation may favorably be performed.

A control method according to the present disclosure for a fuel cell comprising: a power generation unit configured to generate electricity by reacting hydrogen and oxygen; a plurality of aligned solenoid valves for discharging gas or water emitted from the power generation unit to the outside; a control unit configured to control energization of the solenoid valve; and a plurality of temperature detection units configured to detect the temperatures of solenoid valves respectively, comprises: detecting the temperature of the solenoid valve, and if the temperature of the solenoid valve on a downstream side in the discharging direction is equal to or lower than a first predetermined value, energizing the solenoid valve and closing at least one of the other solenoid valves aligned with the energized solenoid valve.

In the present disclosure, the temperature detection unit is provided at each of the solenoid valves on the upstream side and downstream side in the gas and water discharging direction, so that the solenoid valve on the downstream side that may easily be frozen is energized first and heated. This may favorably prevent freezing. The temperature of each solenoid valve is then detected and a solenoid valve is energized as needed, which prevents supply of unnecessary electricity.

Since at least one of the aligned solenoid valves is closed, there is no risk of a hydrogen leak.

Thus, power generation may favorably be performed.

A non-transitory computer readable recording medium according to the present disclosure records a computer program causing a computer configured to control a fuel cell comprising: a power generation unit configured to generate electricity by reacting hydrogen and oxygen; a plurality of aligned solenoid valves for discharging gas or water emitted from the power generation unit to the outside; a control unit configured to control energization of the solenoid valve; and a temperature detection unit configured to detect the temperature of a solenoid valve on a downstream side in the discharging direction, to execute processing of: obtaining the temperature of the solenoid valve; determining whether or not the temperature of the solenoid valve is equal to or lower than a predetermined value; and if it is determined that the temperature of the solenoid valve is equal to or lower than the predetermined value, energizing a solenoid valve on a more upstream side in the discharging direction than the solenoid valve on the downstream side and closing at least one of the other solenoid valves aligned with the energized solenoid valve.

In the present disclosure, the temperature detection unit is provided only at the solenoid valve on the downstream side, so that the solenoid valve on the upstream side where no temperature detection unit is provided is energized first and heated. If the solenoid valve on the upstream side is heated, the heated gas or water flows through a valve on the downstream side while heating the solenoid valve on the downstream side.

At least one of the aligned solenoid valves is closed, thereby eliminating the risk of a hydrogen leak.

Thus, power generation may favorably be performed.

A non-transitory computer readable recording medium according to the present disclosure records a computer program causing a computer configured to control a fuel cell provided with: a power generation unit configured to generate electricity by reacting hydrogen and oxygen; a plurality of aligned solenoid valves for discharging gas or water emitted from the power generation unit to the outside; a control unit configured to control energization of the solenoid valve; and a plurality of temperature detection units configured to detect the temperature of each solenoid valve, to execute processing of: obtaining temperatures of the solenoid valves respectively; determining whether or not a temperature of a solenoid valve on the downstream side in the discharging direction is equal to or lower than a first predetermined value; and outputting, if it is determined that the temperature of the solenoid valve is equal to or lower than the first predetermined value, a command to energize the solenoid valve and to close at least one of the other solenoid valves aligned with the energized solenoid valve.

In the present disclosure, the temperature detection unit is provided at both of the solenoid valves on the upstream side and downstream side in the gas and water discharging direction, so that the solenoid valve on the downstream side that is easily frozen is energized first and heated. This may favorably prevent freezing. The temperature of each solenoid valve is then detected and a solenoid valve is energized as needed, which prevents supply of unnecessary electricity.

At least one of the aligned solenoid valves is closed, thereby eliminating the risk of a hydrogen leak.

Thus, power generation may favorably be performed.

The present invention is not limited to the contents of Embodiments 1 and 4 described above, but various modifications can be made within the scope defined by the appended claims. That is, embodiments to be obtained by combining technical measures obtained from suitable modifications within the scope defined by the claims are also included in the technical scope of the present invention.

For example, the number of solenoid valves aligned in the water or gas discharging direction is not limited to two but may also be three or more. It is however necessary to close at least one of the aligned solenoid valves.

Furthermore, the arrangement of solenoid valves is not limited to the case where multiple solenoid valves are aligned both on the gas discharging side and the water discharging side, but another case may also be employed where solenoid valves are aligned on either one of the discharging sides.

It is to be noted that, as used herein and in the appended claims, the singular forms "a", "an", and "the" include plural referents unless the context clearly dictates otherwise.

What is claimed is:

1. A fuel cell system comprising
a power generation unit configured to generate electricity by reacting hydrogen and oxygen,
a plurality of solenoid valves for discharging gas or water emitted from the power generation unit to an outside,
a drainage;
an exhaust passage;
a hydrogen supply unit supplying the hydrogen to the power generation unit;
a heating source heating the hydrogen supply unit;
a hydrogen supply passage through which the hydrogen flows from the hydrogen supply unit to the power generation unit;
and a control unit configured to control energization of the solenoid valves, wherein
the solenoid valves are aligned along a discharging direction in which the gas or the water is discharged,
the solenoid valves are arranged in series in the drainage or the exhaust passage,
the fuel cell system further comprises a plurality of temperature detection units configured to detect temperatures of the solenoid valves respectively, and in a case where a temperature of a solenoid valve on a downstream side in the discharging direction is equal to or lower than a first predetermined value, the control unit energizes the solenoid valve and closes at least one of other solenoid valves aligned with the solenoid valve that is energized.

2. The fuel cell system according to claim 1, wherein, in a case where the solenoid valve is being energized, the control unit continues energization when the temperature of the solenoid valve is equal to or lower than a first predetermined value and the temperature of a solenoid valve on a more upstream side in the discharging direction than the solenoid valve that is being energized is equal to or higher than a second predetermined value.

3. The fuel cell system according to claim 1, wherein the control unit switches the solenoid valve to be energized in a case where a predetermined time elapses.

4. The fuel cell system according to claim 1, wherein, in a case of performing the energization processing, the control unit supplies, to the solenoid valve, current having a same polarity as a polarity of drive current in energization processing performed at the time of discharging the gas or the water to the outside.

5. The fuel cell system according to claim 1, wherein, in a case of terminating the energization processing, the control unit closes the solenoid valves in sequence from a solenoid valve on an upstream side in the discharging direction.

6. The fuel cell system according to claim 1, wherein the solenoid valve is covered with a heat insulating material.

7. A control method for a fuel cell system comprising:
a power generation unit configured to generate electricity by reacting hydrogen and oxygen;
a plurality of aligned solenoid valves for discharging gas or water emitted from the power generation unit to an outside;
a drainage;
an exhaust passage;
a hydrogen supply unit supplying the hydrogen to the power generation unit;
a heating source heating the hydrogen supply unit;
a hydrogen supply passage through which the hydrogen flows from the hydrogen supply unit to the power generation unit;
a control unit configured to control energization of the solenoid valve; and
a plurality of temperature detection units configured to detect temperatures of the solenoid valves respectively, wherein the solenoid valves are arranged in series in the drainage or the exhaust passage, the method comprising:
detecting temperatures of the solenoid valves, respectively, and
in a case where a temperature of a solenoid valve on a downstream side in a discharging direction is equal to or lower than a first predetermined value, energizing the solenoid valve and closing at least one of other solenoid valves aligned with the solenoid valve that is energized.

8. A non-transitory computer readable recording medium with a computer program for causing a control unit to control a fuel cell system comprising:
a power generation unit configured to generate electricity by reacting hydrogen and oxygen;
a plurality of aligned solenoid valves for discharging gas or water emitted from the power generation unit to an outside;
a drainage;
an exhaust passage;
a hydrogen supply unit supplying the hydrogen to the power generation unit;
a heating source heating the hydrogen supply unit;
a hydrogen supply passage through which the hydrogen flows from the hydrogen supply unit to the power generation unit;
the control unit configured to control energization of the solenoid valves; and
a plurality of temperature detection units configured to detect temperatures of solenoid valves respectively, wherein the solenoid valves are arranged in series in the drainage or the exhaust passage,
the computer program causing the control unit to execute processing of:
obtaining temperatures of the solenoid valves respectively;
determining whether or not a temperature of a solenoid valve on a downstream side in a discharging direction is equal to or lower than a predetermined value; and
outputting, in a case where it is determined that the temperature of the solenoid valve is equal to or lower than the first predetermined value, a command to energize the solenoid valve and to close at least one of other solenoid valves aligned with the solenoid valve that is energized.

* * * * *